UNITED STATES PATENT OFFICE.

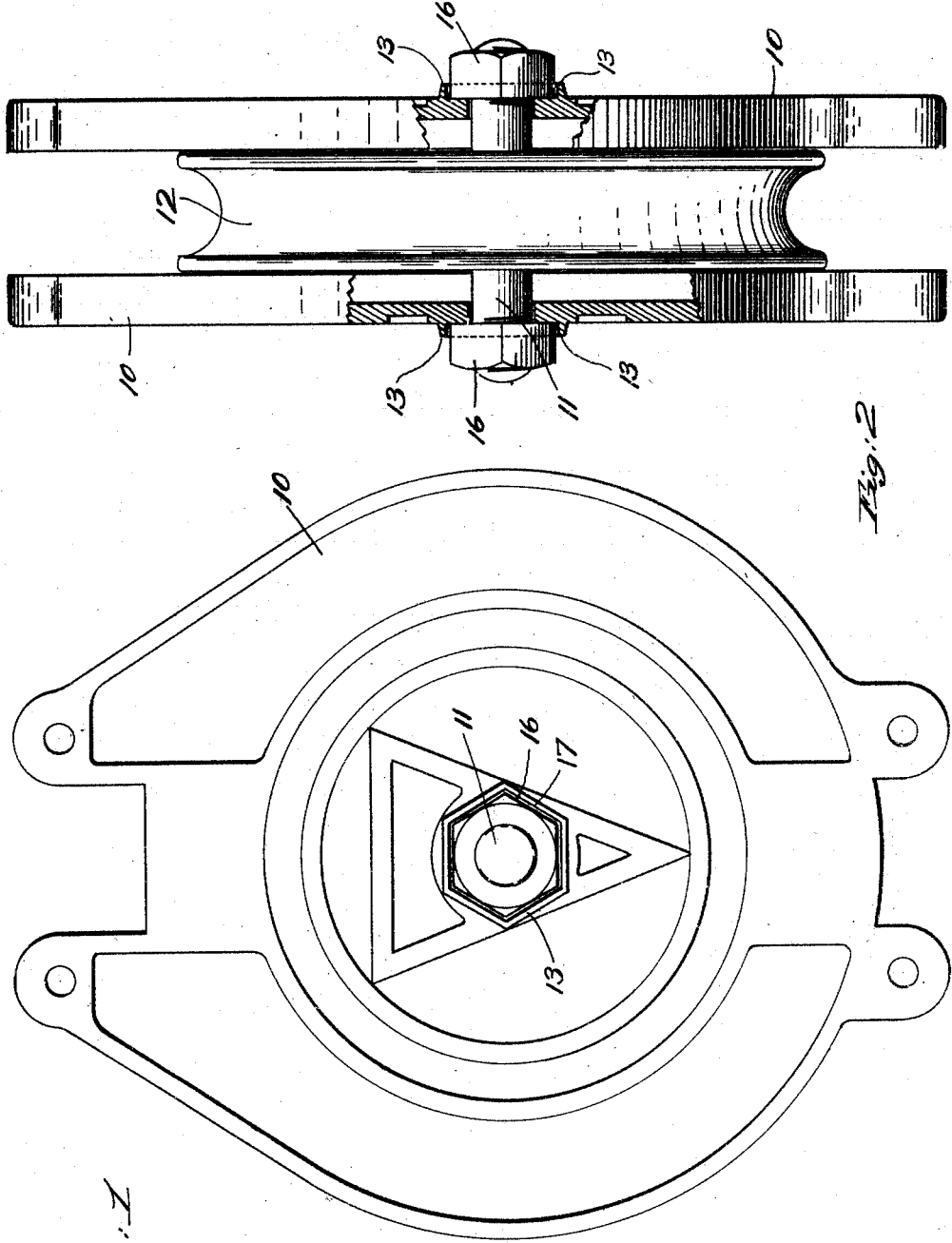

WILLIAM J. LEE, OF EASTON, PENNSYLVANIA, ASSIGNOR TO MARINE DECKING AND SUPPLY CO., OF PHILADELPHIA, PENNSYLVANIA, A CORPORATION OF DELAWARE.

PULLEY-BLOCK CONSTRUCTION.

1,366,088.  Specification of Letters Patent. Patented Jan. 18, 1921.

Application filed June 21, 1920. Serial No. 390,627.

*To all whom it may concern:*

Be it known that I, WILLIAM J. LEE, a citizen of the United States, residing at the city of Easton, county of Northampton, and State of Pennsylvania, have invented a certain new and useful Improved Pulley-Block Construction, of which the following is a specification.

This invention generally stated relates to pulley blocks having metal shells and has more especial relation to means for retaining the sheave-pins thereof in proper position. It is common practice to employ sheave-pins having screw-threaded ends for nut reception one nut being retained in position by burring a sheave-pin end and the other nut being secured by means of a cotter-pin passing through both the nut and the sheave-pin. This necessitates drilling of the nut and sheave-pin which not only consumes considerable time but is more or less expensive and frequently results in breaking of a drill.

This invention has for its leading object to eliminate the use of cotter-pins and the burring of sheave pin ends and provide a novel means for securing sheave-pin nuts in proper position. Other objects will appear hereinafter.

The invention consists of the improvements hereinafter described and finally claimed.

The nature, characteristic features and scope of the invention will be more fully understood from the following description taken in connection with the accompanying drawings forming part hereof, and in which:

Figure 1, is a view in side elevation of a pulley-block embodying features of the invention, and Fig. 2, is a view in end elevation thereof partly sectioned.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the tackle block illustrated in the drawings a pair of shells 10 of malleable iron or equivalent material are employed and are apertured for the passage therethrough of a sheave-pin 11. A sheave wheel 12 is mounted upon such pin. Surrounding the aperture of each shell is a raised portion or rim 13 of hexagonal configuration. In practice a rim is formed integral with a shell, although this is not essential, extends about one-eighth of an inch above the surface of a shell and may be tapered interiorly and exteriorly considered if desired. In assembling the parts a sheave-pin with a nut 14 screwed loosely to one end is passed through the aperture of one of the shells, the bushing of the sheave wheel and through the aperture of the opposite shell. A nut is then screwed upon the projected end of the sheave-pin. The respective nuts are then screwed to place with the result that they first turn upon the outer faces of the raised portions or rims 13. Further turning of the nuts serves to bring the "flats" 16 of the nuts in register with the "flats" 17 of the rims 13 whereupon the nuts slip within the confines of said rims and form an interlock. Should an additional turn of either nut now be required, application of a suitable tool, as a wrench, will serve to force a nut along the beveled inner wall of a rim to its outer face which pressure serves to "spring" the shells toward one another sufficiently to permit a proper turn of a nut. As the aforesaid "flats" once more register the nut again drops into place with the shells simultaneously "springing" outward to efficiently coöperate in the resultant interlock. It may be stated that the shells of a pulley-block of the type under consideration may be "sprung" as much as one-quarter of an inch upon each side of a pulley-block construction.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the

What I claim is:—

1. In a device of the character stated a resiliently mounted plate having an aperture therethrough, a raised portion or rim surrounding said aperture to form a socket of the configuration of a nut, a threaded spindle projected through said aperture and a nut fitted to said spindle whereby when said nut is tightened it first rides upon said rim until the "flats" of the nut register with the "flats" of said socket whereupon the nut seats itself within said socket due to the yielding of said plate.

2. In a pulley-block the combination of a shell possessed of yielding characteristics said shell having an aperture therethrough, a raised portion or rim surrounding said aperture to form a socket of the configuration of a nut, a threaded sheave-pin projected through said aperture and a nut fitted to said pin whereby when the nut is tightened it first rides upon said rim until the "flats" of the nut register with the "flats" of the said socket whereupon the nut seats itself within said socket due to the yielding of said shell.

3. A construction as described in claim 2 characterized by said socket being provided with walls which are beveled to assist in the guiding of said nut toward and away from said socket.

In testimony whereof I have hereunto signed my name.

WILLIAM J. LEE.